April 30, 1968   B. L. A. VAN DER SCHEE   3,380,715
APPARATUS FOR TREATING HIGHLY VISCOUS MATERIAL
Filed Nov. 4, 1965   2 Sheets-Sheet 1

INVENTOR.
BERNARD LOUIS ANTON VAN DER SCHEE
BY
AGENT

April 30, 1968   B. L. A. VAN DER SCHEE   3,380,715
APPARATUS FOR TREATING HIGHLY VISCOUS MATERIAL
Filed Nov. 4, 1965   2 Sheets-Sheet 2

INVENTOR.
BERNARD LOUIS ANTON VAN DER SCHEE
BY
AGENT

United States Patent Office 3,380,715
Patented Apr. 30, 1968

3,380,715
APPARATUS FOR TREATING HIGHLY VISCOUS MATERIAL
Bernard L. A. van der Schee, Arnhem, Netherlands, assignor to American Enka Corporation, Enka, N.C., a corporation of Delaware
Filed Nov. 4, 1965, Ser. No. 506,326
Claims priority, application Netherlands, Nov. 20, 1964, 13,495, 13,496
6 Claims. (Cl. 259—6)

ABSTRACT OF THE DISCLOSURE

Apparatus for treating highly viscous materials, such treatment comprising blending, mixing or degasifying, including in combination: two cylindrical rollers positioned substantially parallel to end at a short distance from each other, a drive coupling adapted to connect the rollers to a source of power for rotation thereof in opposite directions, an inlet and outlet for the supply and discharge of the viscous material, and means for collecting and redepositing portions of the material which sink and drop off the rollers to a treating area thereon.

---

This invention relates to an apparatus for treating highly viscous materials and is particularly useful for blending, mixing, or degasifying reactive materials of polymerization. More specifically, this invention concerns an improvement over application for U.S. Letters Patent Ser. No. 419,129, now U.S. Patent No. 3,345,041, commonly assigned herewith and relating to a method and apparatus for polymerizing highly viscous materials used to produce film- and fiber-forming products.

In the above mentioned patent, highly viscous substances such as polyester, polyamide and other polymeric compositions are subjected to a mixing and blending operation by the use of an apparatus consisting of two parallel, spaced rollers cooperating to form a material receiving trough area between their upper surfaces. Simultaneous rotation of the rollers in opposite directions causes a viscous gob of material, superimposed thereon, to be drawn into the nip area between the roller surfaces where the material is pressed into a thin sheet. The sheet, upon leaving the nip area, is divided into two thin films which adhere to the two respective roller surfaces. These films are circumferentially transported by the roller surfaces, back into the rotating gob of material in the trough area between the rollers where they are once again blended into a viscous mass.

In order to improve the blending, mixing, and degasification of material, the above mentioned patent provides a comb device consisting of a plurality of hollow, open-ended teeth which extend from above the rotating viscous gob down to the gob and terminating in the nip area of the rollers. The system is maintained under a partial vacuum and the hollow teeth, which communicate with the exterior atmosphere, divide material passing through the nip area with the aid of positive gas pressure provided at the tooth ends. A series of upstanding ribs, perpendicular to the plane of film on each roller surface, is thus formed as the viscous sheet divides into the roller surface film. The ribs created increase the surface area of the film as much as 200–300%, depending on the particular relationship of the teeth in the nip area of the rollers.

The ribs aid in the polymerization reaction in several ways. Because of the increased surface area, undesirable gaseous components can be more effectively removed from the viscous material when a partial vacuum is maintained on the system. The ribs, upon being pressed back into the rotating gob between the rollers, are folded or pleated to allow a more efficient blending of the components of the mixture. Additionally, when high and low viscosity substances are to be blended, the pleating or folding effect occurring just prior to recombining can be used to entrap surrounding vapor into the reaction mixture, and the low viscosity material may be introduced into the system in vaporous form to bathe the highly viscous material and be blended quite effectively therein.

Although this former patent improves the mixing, blending and degasifying effects of known parallel roller type blending apparatus, it has one significant disadvantage. It has been found that interruption of operation of the device causes considerable difficulty. When for any reason the apparatus is stopped and the rollers stop rotating, the material being treated has a tendency to sink between the rollers and drip off, thus collecting on the bottom of the container in which the apparatus is mounted. After a period of time, this collection will build up and interfere with proper mixing and degassing when operation is resumed. This makes it necessary to completely shut down and dismantle the apparatus to clean the material off the bottom and manually recycle it to the rollers. As one can well appreciate, this is a very expensive and time consuming operation.

Therefore, it is an object of the present invention to overcome the disadvantages of the type blending apparatus mentioned above.

It is a further object of this invention to provide an improved apparatus for effectively blending and mixing and degasifying highly viscous materials.

Another object of this invention is to provide a blending apparatus for effectively polymerizing highly viscous substances in which degasification of material is desirable.

Still another object of this invention is to provide apparatus for collecting and recycling viscous substances which have a tendency to sink between and drip off mixing rollers during interruption of operation.

The manner in which these and other objects of the invention are attained will become more apparent from the following description of the invention which is intended to be illustrative rather than limitative.

According to the present invention, it has been discovered that viscous material collecting on the housing bottom of a mixing vessel can be effectively recycled by pooling the material and passing means through the pooled material to collect and recycle it to a treating area between the mixing and degassing rollers. Thus, the material is collected and continuously degassed by blending and pressing into a thin sheet along with any additional material introduced to the apparatus.

In one embodiment of the invention, at least one disc is axially aligned with and affixed to at least one mixing roller although plural discs mays be used, if desired. It is preferred, for the purposes of this invention, that the disc have a diameter greater than the roller and extend in close proximity to the bottom of the enclosing housing. The bottom of the housing slopes to pool the material beneath the rotating disc. As a result the disc, upon being rotated, will dip into the accumulated material and in cooperation with a scraper blade mounted near the top of its path of rotation, will redeposit the material to the rollers.

It has also been found desirable to enclose the disc with a stationary trough which may be mounted on or integral with the housing supporting the reactive material-treating apparatus. This stationary trough serves to press the material against the disc rim for more effective transportation to the rollers. Additionally, the trough prevents the material from being thrown against the housing wall, thereby preventing formation of undesirable decomposition products in the final product quality.

An additional embodiment of the invention comprises positioning the rollers near the bottom of the housing and having the bottom sloping in such a manner to effectively pool the material beneath the rollers. The rollers, when rotated and when partially submerged within the pooled material, will collect part of the material. Above the rollers, the mass splits into two thin films which will adhere to the two respective roller surfaces. These films are circumferentially transported by the roller surfaces back into the material in the bottom of the vessel where they are again blended with the viscous mass.

In order to further illustrate the present invention, reference is made to the accompanying diagrammatic drawings, wherein.

Figure 1:
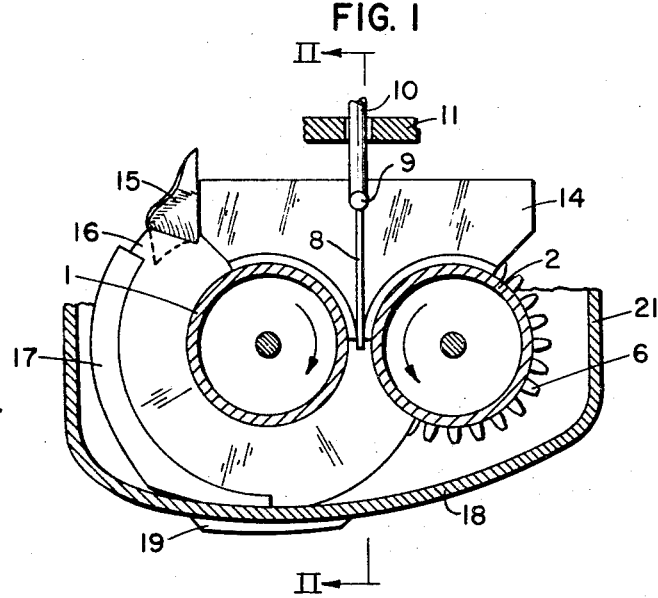
FIGURE 1 shows a cross-sectional view of the apparatus.

FIGURES 1–4 show parallel, cylindrical rollers 1 and 2 positioned a short distance from each other. Roller 2 is mounted on a freely rotatable shaft and roller 1 on shaft 3 is driven in the direction indicated by the arrow. The supporting shafts are mounted for rotation in suitable bearings provided in housing wall 4 and 5. The rollers 1 and 2 are intercoupled by means of identical gears, one of which is identified by 6. They are connected in such a way that they rotate in opposite directions and at the same speed. A comb device, located above the rollers, has solid teeth 8 which extend downwardly into the nip area between the rollers. The teeth 8 are connected by support bar 9 to a vertical support 10 which is adjustably attached to a conventional sealed housing surrounding the entire apparatus. The entire comb device may be raised or lowered by suitable means (not shown) to vary the distance teeth 8 extend into the nip area. For example, support 10 may be threaded and locknuts may be used in order to adjust the same vertically with respect to the housing. Alternatively, the teeth may be adjusted individually by conventional means to vary the rib height along the longitudinal axis of the rollers. Although the size and shape of the individual teeth may be varied to produce desired rib configuration, the teeth are preferably rectangular in shape with the long axis of the rectangle disposed perpendicular to the longitudinal axis of the rollers.

Figure 2:
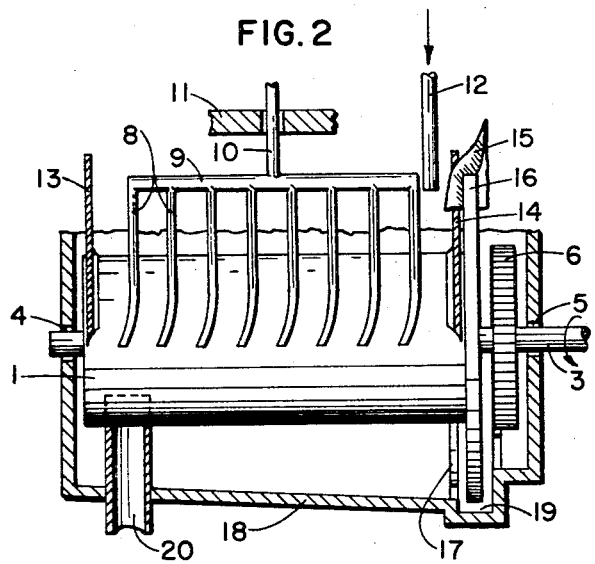
FIGURE 2 shows a longitudinal section taken along lines II—II of FIGURE 1.
Figure 3:
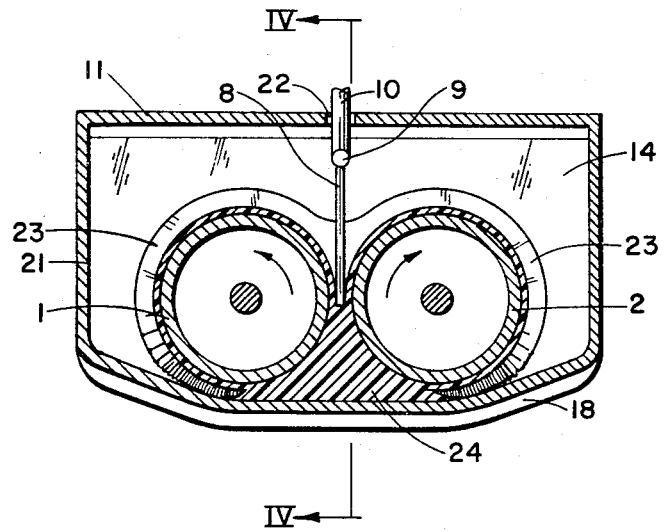
FIGURE 3 shows a cross-sectional view of an additional embodiment of the present invention.
Figure 4:
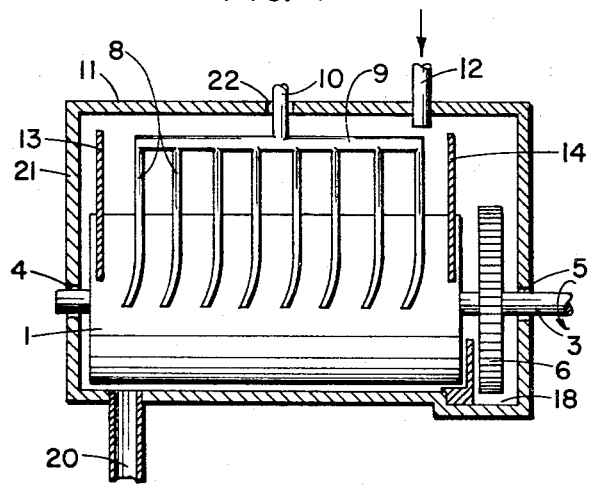
FIGURE 4 shows a longitudinal section of the apparatus taken along lines IV—IV of FIGURE 3.

The enclosed sealed housing 11 is shown in cross section. The material to be treated is fed into the mixing apparatus via supply conduit 12. The entire apparatus may be maintained under a partial vacuum by conventional pumping means attached to the housing. The material introduced through the conduit 12 flows to the opposite end of the rollers and is removed from the mixer by conventional doctor blade means (not shown). Movement of the material from inlet conduit 12 along the surface of the rollers to the discharge point is aided by curving the ends of teeth 8 as shown in FIGURES 2 and 4. The contact action of teeth 8 causes a localized thinning of the film of material on rollers 1 and 2 and subsequent formation of high membraneous ribs 23, for the sake of clarity, only one of which is shown in FIGURE 3. The height of these ribs is preferably between 1–1.5 times the width of the space between them. However, such spacing and rib height may be controlled by the number of teeth utilized, the distance between rollers 1 and 2, and the extent to which the teeth extend into the area between the rolls. Utilizing a tooth spacing to produce ribs having a height of 1–1.5 times the width, a surface enlargement of 200–300% is obtained in the material on the rollers. Partitions 13 and 14 act to retain the liquid mass on the surfaces of the rollers to prevent the material from coming into contact with the roller shafts and gear elements 6.

FIGURES 1 and 3 show sidewalls 21 of housing 11 with bottom 18 being sloped to effectively pool material 24 (FIGURE 3 only) beneath rollers 1 and 2 or disc member 16.

FIGURES 1 and 2 show the embodiment wherein the material sinking to sloping bottom portion 18 of housing 11 is recycled by a revolving disc. Disc 16 is attached to and aligned with roller 1. The disc is adapted for rotation within curved trough 17 (as best shown in FIGURE 1). Trough 17 is secured by and tapers into housing bottom 18 at 19 and extends partially around disc 16 upwards terminating in the vicinity of scraper 15. Scraper 15, secured to partition 14, is contiguous to the sides of the disc rim and is designed to guide the material adhering thereto to the roller surface.

FIGURES 3 and 4 show the material sinking to sloping housing bottom member 18 being collected and recycled by rollers 1 and 2. In this embodiment, bottom 18 slopes upwards beneath rollers 1 and 2 to effectively pool the material directly under the space between rollers at 24. Therefore, upon rotation in direction indicated in FIGURE 3, a portion of the mass will be continuously transported between the rollers in an upward direction.

In operating the apparatus of the present invention, it has been found that the portion of the material which has dripped off the rollers during a period of inactivity, immediately resumes the desired flow pattern and blends satisfactorily with any additional material added. This is of particular significance in treating synthetic polymer material such as polyethylene terephthalate and experiments have shown that no appreciable difference in polymer quality is found over polymer treated in apparatus which was not shut down for any period.

Thus it is obvious from the above description that the invention may be used to perform a variety of functions and the methods of material treatment practiced thereby may vary. The extent and scope of the invention therefore should only be limited by the following claims.

What is claimed is:

1. In an apparatus for treating highly viscous material comprising two cylindrical rollers positioned substantially parallel to and at a short distance from each other, a driving system for rotating said rollers in opposite directions, an inlet and outlet for the supply and discharge of the viscous material, the improvement which comprises means for collecting and redepositing viscous material which has a tendency to sink and drop off the rollers to a treating area defined by said rollers and wherein said means for collecting the material comprises a sloped housing bottom.

2. Apparatus as defined in claim 1 wherein said means for redepositing said material comprises a disc circumferentially attached to at least one of the rollers, said disc having a diameter greater than said roller.

3. Apparatus as defined in claim 2 wherein said disc cooperates with and passes through a stationary trough.

4. Apparatus as defined in claim 2 wherein said disc cooperates with a scraper.

5. Apparatus as defined in claim 1 wherein said means for redepositing the material comprises the rollers for treating the viscous material and which are positioned in close proximity to the housing bottom and wherein the bottom is sloped in a manner to pool the viscous material between said rollers.

6. In an apparatus for treating highly viscous material comprising two cylindrical rollers positioned substantially parallel to and spaced a short distance from each other, an inlet and outlet for supply and discharge of the viscous material, the improvement which comprises means axially aligned, affixed to and rotatable with at least one of said rollers for collecting and redepositing a portion of said material which sinks and drops off the rollers to a treating area thereon.

References Cited

UNITED STATES PATENTS 1,220,221   3/1917   Graham _____ 18—2

WALTER A. SCHEEL, *Primary Examiner.*

J. M. BELL, *Assistant Examiner.*